United States Patent
VanDruff et al.

(10) Patent No.: US 7,275,710 B2
(45) Date of Patent: Oct. 2, 2007

(54) AIRCREW RESTRAINT SYSTEM

(76) Inventors: Charles E. VanDruff, 24882 Buckboard La., Laguna Hills, CA (US) 92653; Eric Kawabata, 3410 E. Lambeth Ct., Orange, CA (US) 92869; Christopher C. Culbertson, 3 Del Cambrea, Irvine, CA (US) 92606

( * ) Notice: Subject to any disclaimer, the term of this patent is extended or adjusted under 35 U.S.C. 154(b) by 33 days.

(21) Appl. No.: 11/154,100

(22) Filed: Jun. 15, 2005

(65) Prior Publication Data

US 2006/0284012 A1 Dec. 21, 2006

(51) Int. Cl.
*B64C 1/00* (2006.01)

(52) U.S. Cl. .............. 244/1 R; 244/118.5; 244/129.1; 182/3; 182/231; 182/232

(58) Field of Classification Search .............. 244/149, 244/121, 118.5, 129.1, 1 R, 137.2, 137.5; 182/3, 231–235; 482/69
See application file for complete search history.

(56) References Cited

U.S. PATENT DOCUMENTS

| | | | | |
|---|---|---|---|---|
| 895,055 A * | 8/1908 | Spooner | ................... | 472/15 |
| 1,409,702 A * | 3/1922 | Gill | ................... | 182/3 |
| 2,994,497 A * | 8/1961 | Hoffacker, Jr. et al. | ..... | 244/149 |
| 3,780,663 A * | 12/1973 | Pettit | ................... | 104/307 |
| 4,159,556 A | 7/1979 | Dickson | ................... | 16/87.4 R |
| 4,256,098 A * | 3/1981 | Swan et al. | ................... | 5/85.1 |
| 4,410,175 A * | 10/1983 | Shamp | ................... | 482/69 |
| 4,445,502 A | 5/1984 | Swan et al. | ................... | 128/25 R |
| 4,776,532 A * | 10/1988 | Haltbrekken | ................... | 244/118.5 |
| 5,762,282 A | 6/1998 | Wolner | ................... | 242/390.8 |
| 5,842,652 A | 12/1998 | Warsing et al. | ................... | 241/81 |
| 6,148,580 A | 11/2000 | Weir | ................... | 52/651.1 |
| 6,315,138 B1 | 11/2001 | Dyson | ................... | 212/336 |
| 6,488,118 B1 | 12/2002 | Corriveau | ................... | 182/36 |
| 2002/0179368 A1 | 12/2002 | Evangelista | ................... | 182/3 |
| 2003/0150672 A1 | 8/2003 | Cheval | ................... | 182/3 |
| 2003/0205926 A1 | 11/2003 | Ruff | ................... | 297/464 |
| 2004/0154493 A1 | 8/2004 | Faucher et al. | ................... | 104/89 |

* cited by examiner

*Primary Examiner*—J. Woodrow Eldred
(74) *Attorney, Agent, or Firm*—Kenneth L. Green; Edgar W. Averhill, Jr.

(57) ABSTRACT

A mobile aircrew restraint system includes a track system and a trolley which runs along the track and carries a retractor which releases a webbing strap attached to a harness. The track is preferably an extruded or sectioned track which follows contours of an aircraft interior and may be removable and/or retractable to allow additional room for oversize cargo. The trolley includes an interlock pin which cooperates with interlock holes spaced one to two feet apart along the track, and includes a release handle for disengaging the interlocking pin. The strap retractor is attached to the trolley and is controllable to limit the payout of the webbing strap. The harness is worn by an aircrew member and is attached to the webbing strap by releasable buckles.

19 Claims, 6 Drawing Sheets

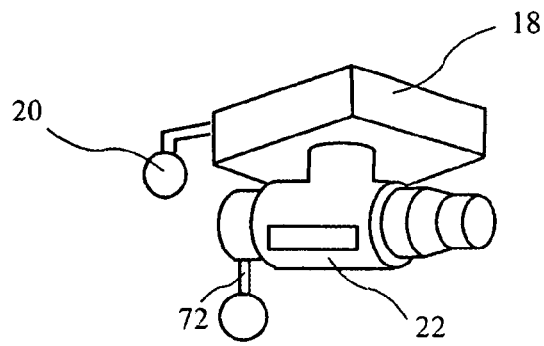
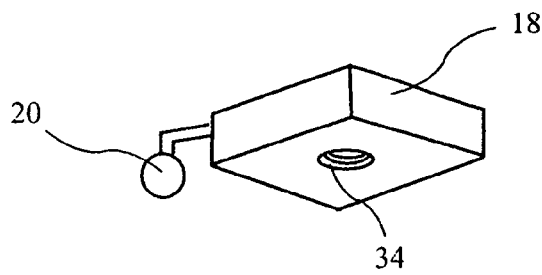
FIG. 4    FIG. 4A
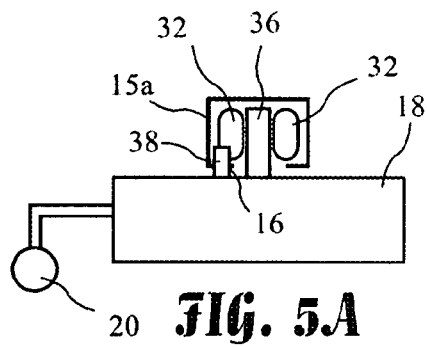
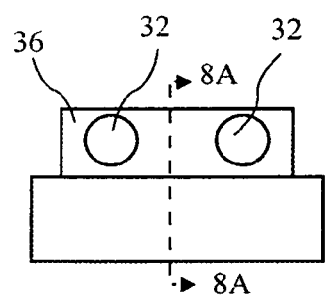
FIG. 5A    FIG. 5B
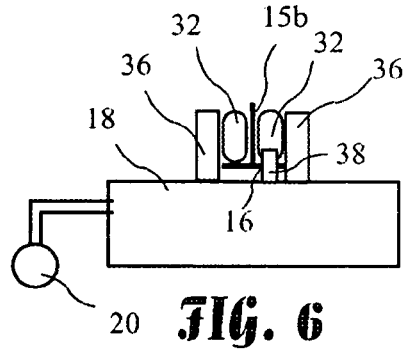
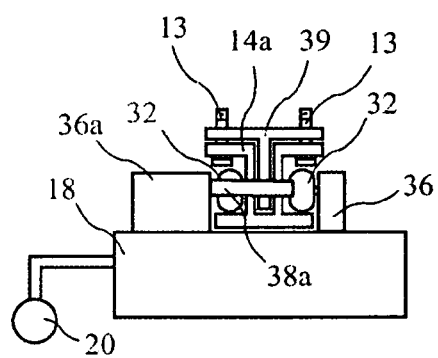
FIG. 6    FIG. 6A
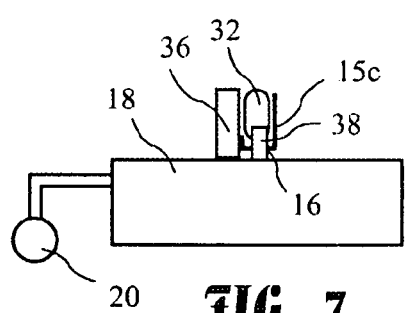
FIG. 7

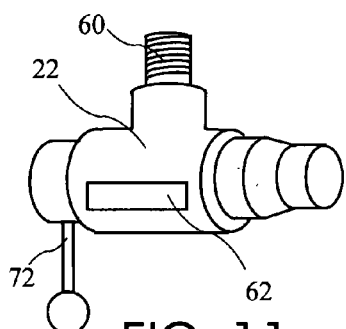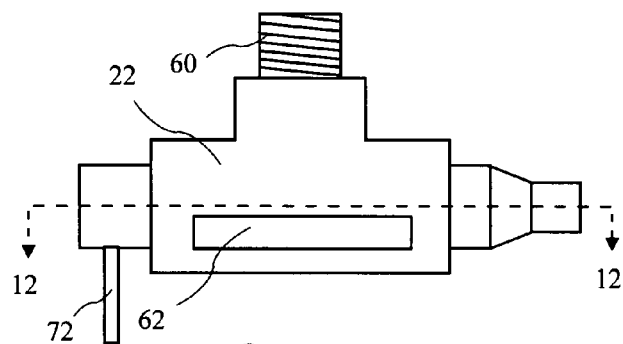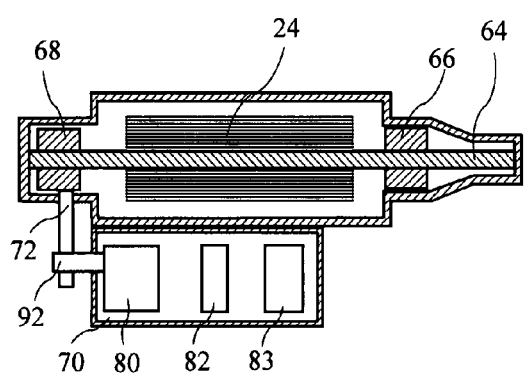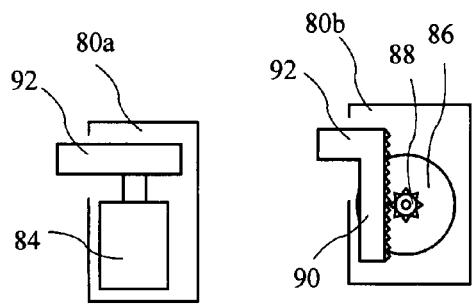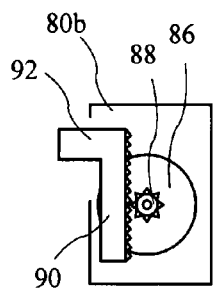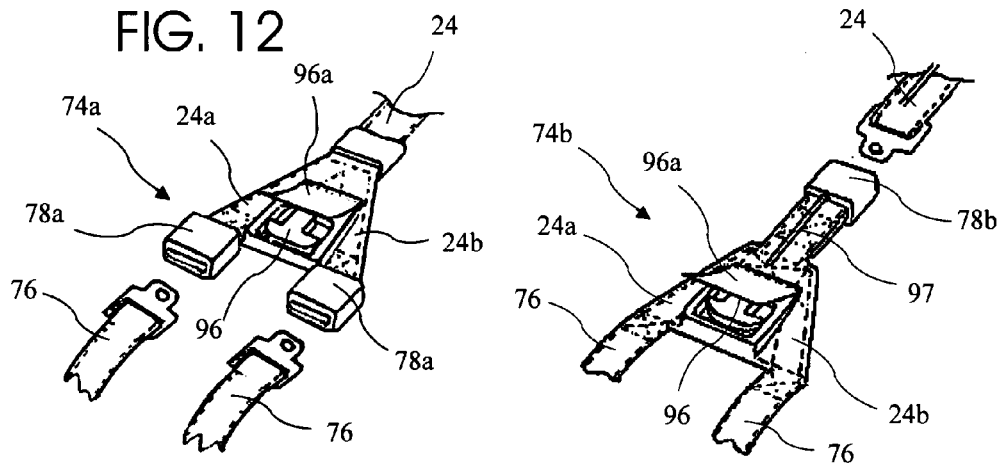
FIG. 11    FIG. 11A
FIG. 12    FIG. 13A    FIG. 13B
FIG. 14A    FIG. 14B

AIRCREW RESTRAINT SYSTEM

BACKGROUND OF THE INVENTION

The present invention relates to safety restraint systems and in particular to a mobile restraint system for aircrew members.

Aircrew members in both fixed wing and helicopters are often required to perform various tasks during flight. Such tasks, for example, include cargo handling and weapons use. In military aircraft in particular, maneuvers may be required without warning, and an unrestrained crew member may be injured or even thrown from the aircraft. Unfortunately, aircrew members have been ejected from helicopters and seriously injured during relatively benign ground impacts.

The Mobile Aircrew Webbing Retractor (MAWR) made by H. Koch & Sons Co. in Anaheim, Calif. (the assignee of the present invention) provides a harness attached to a webbing strap released from an inertial locking reel. The MAWR incorporates 80 inches of retractable Kevlar webbing for restraint management. A dual-mode inertia locking system is used, sensitive to vehicle and webbing strap acceleration. Webbing slack in the restraint is eliminated, allowing the aircrew to concentrate on their mission without constantly readjusting their safety strap while minimizing tripping hazards. Although the MAWR provides a degree of safety for a gunner residing in a single location in the aircraft, the MAWR does not provide an ability to move about a large aircraft interior to perform various tasks.

BRIEF SUMMARY OF THE INVENTION

The present invention addresses the above and other needs by providing a mobile aircrew restraint system which includes a track system and a trolley which runs along the track and carries a retractor which releases a webbing strap attached to a harness. The track is preferably an extruded or sectioned track which follows contours of an aircraft interior and may be removable and/or retractable to allow additional room for oversize cargo. The trolley includes an interlock pin which cooperates with interlock holes spaced one to two feet apart along the track, and includes a release handle for disengaging the interlocking pin. The strap retractor is attached to the trolley and is controllable to limit the payout of the webbing strap. The harness is worn by an aircrew member and is attached to the webbing strap by releasable buckles.

In accordance with one aspect of the invention, there is provided a mobile aircrew restraint system comprising a track having spaced apart interlock holes, a trolley running along the track, a retractor attached to the trolley, a strap which is retractable and extendable from the retractor, and a harness attached to the strap. The trolley includes an interlock pin to cooperate with the spaced apart interlock holes to lock the trolley at positions along the track and the retractor is a lockable retractor whereby the strap is locked against further extension from the retractor.

In accordance with yet another aspect of the invention, there is provided a mobile aircrew restraint system wherein all components are preferably operable in a military aircraft environment (fixed-wing and helicopter), and more preferably are able to withstand MIL-STD-810 environmental exposure as well as being immune to Electrostatic Discharge (ESD) and/or Electro Magnetic Interference (EMI). The emissions from all components preferably do not interfere with the aircraft's flight control, navigation, or weapon systems.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 shows a detailed perspective view of a trolley and retractor of the aircrew restraint system.

FIG. 4A is a perspective view of the trolley without the retractor.

FIG. 5A is a front view of the trolley with a first wheel and track arrangement.

FIG. 5B is a side view of the trolley and wheels.

FIG. 6 is a front view of the trolley with a second wheel and an inverted T track arrangement.

FIG. 6A is a lightweight inverted T track with a horizontal interlocking pin.

FIG. 7 is a front view of the trolley with a third wheel and track arrangement.

FIG. 11 is a perspective view of the retractor and threaded attachment.

FIG. 11A is a front view of the retractor and the threaded attachment.

FIG. 12 is a cross-sectional view of the retractor taken along line 12-12 of FIG. 11A.

FIG. 13A is a locking module with a solenoid.

FIG. 13B is a locking module with a motor and gears.

FIG. 14A is a first harness yoke.

FIG. 14B is a second harness yoke.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
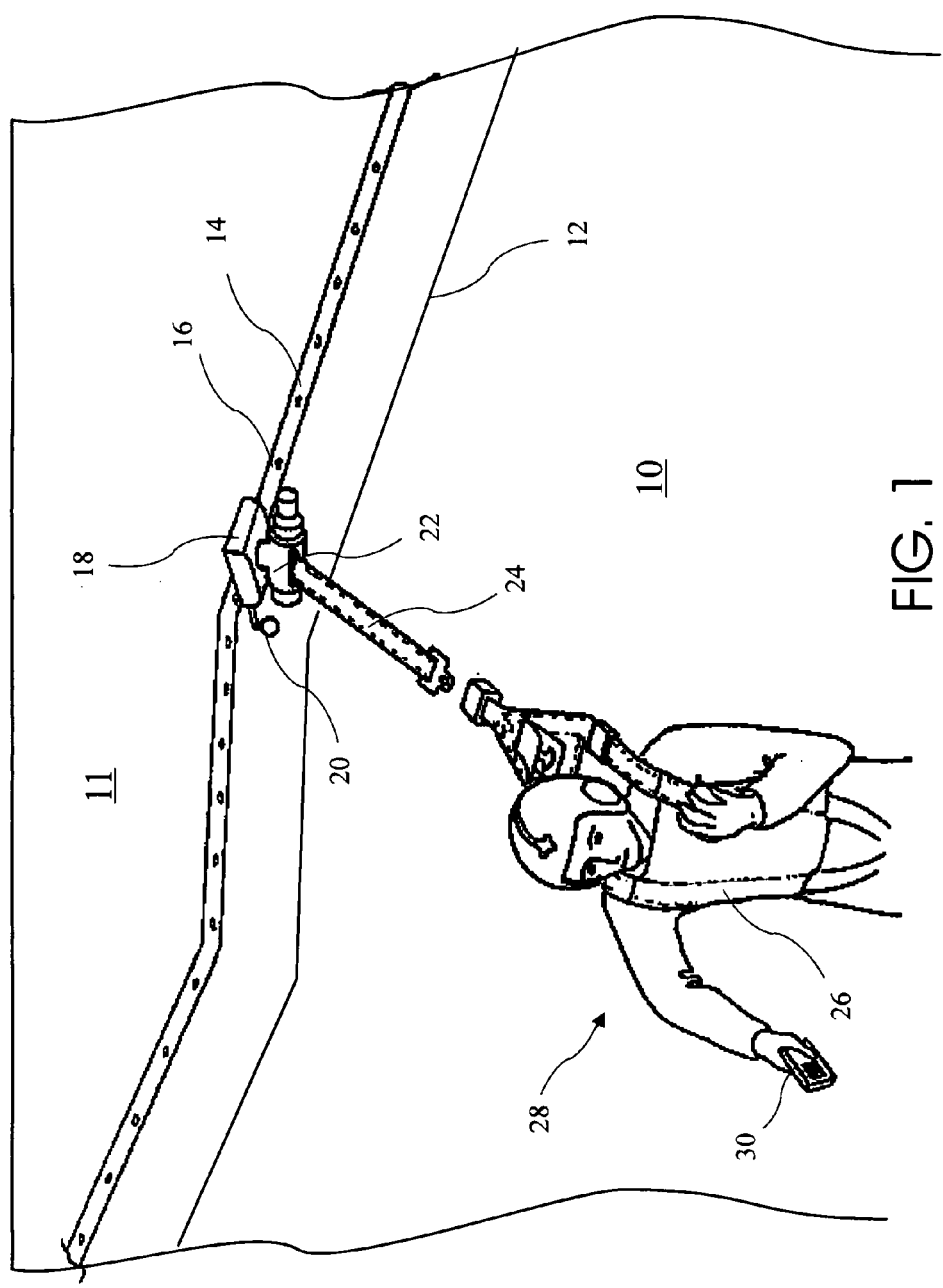
FIG. 1 is an aircrew restraint system according to the present invention mounted inside an aircraft and restraining an aircrew member.
Figure 8A:
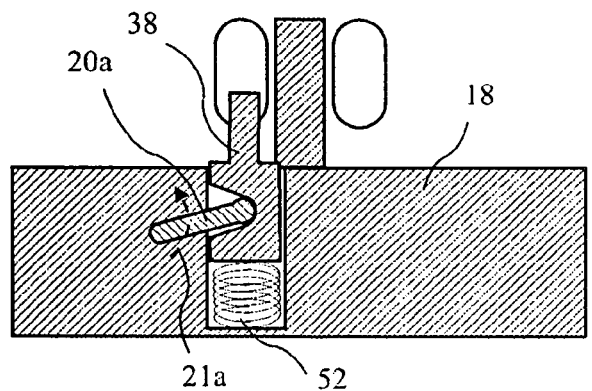
FIG. 8A is cross-sectional view of the trolley 18 taken along line 8A-8A of FIG. 5B, with an interconnect pin extended.
Figure 8B:
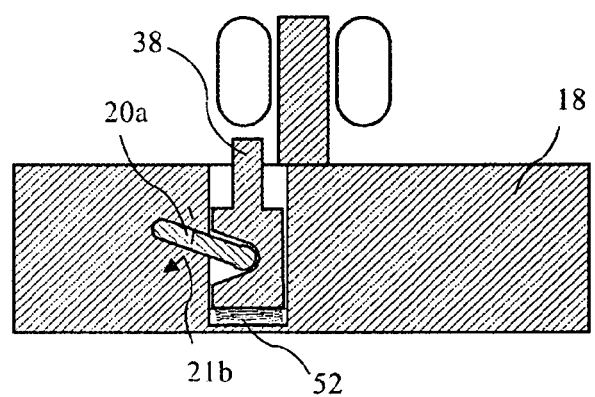
FIG. 8B is cross-sectional view of the trolley 18 taken along line 8A-8A of FIG. 5B, with the interconnect pin retracted.

An aircrew restraint system according to the present invention is shown mounted in an aircraft interior, and restraining an aircrew member 28 in FIG. 1. The aircrew restraint system may be mounted to an interior wall 10 or ceiling 11, and is preferably mounted to the ceiling 11. The aircrew restraint system includes a track 14 which preferably follows contours 12 of the interior wall 10 and/or interior ceiling 11. A trolley 18 rides on the track 14, and is lockable (or fixable) at spaced apart positions (e.g., interlock holes 16) along the track 14 by a trolley locking mechanism. The trolley locking mechanism preferably comprises cooperation of an interlock pin 38 (see FIG. 5A) with interlock holes 16 spaced apart along the track 14. The interlock holes 16 are preferably spaced between one and two feet apart. The interlock pin 38 is preferably biased in a locked (or engaged) position, and a trolley handle 20 is actuated to disengage the interlock pin 38 from the interlock holes 16, wherein releasing the trolley handle 20 allows the interlock pin 38 to return to the locked position as shown in FIGS. 8A and 8b.

A retractor 22 is attached to the trolley 18, and a strap 24 is extendable from and retractable into the retractor 22. The strap 24 may further be locked at a specific length of extension from the retractor 22 or limited to a maximum length of extension from the retractor 22. A harness 26 is attached to the strap 24, and the harness 26 is worn by the aircrew member 28. The aircrew member 28 holds a remote control 30 which preferably may be used to lock the length of extension of the strap 24 from the retractor 22. The track 14, trolley 18, and trolley locking mechanism are preferably constructed to safely react to the loads present during an aircraft crash event. The trolley 18 is also easily removable from the track 14 for maintenance by removing an end plate of the track and sliding the trolley 18 off an end of the track 14.

Figure 2A:
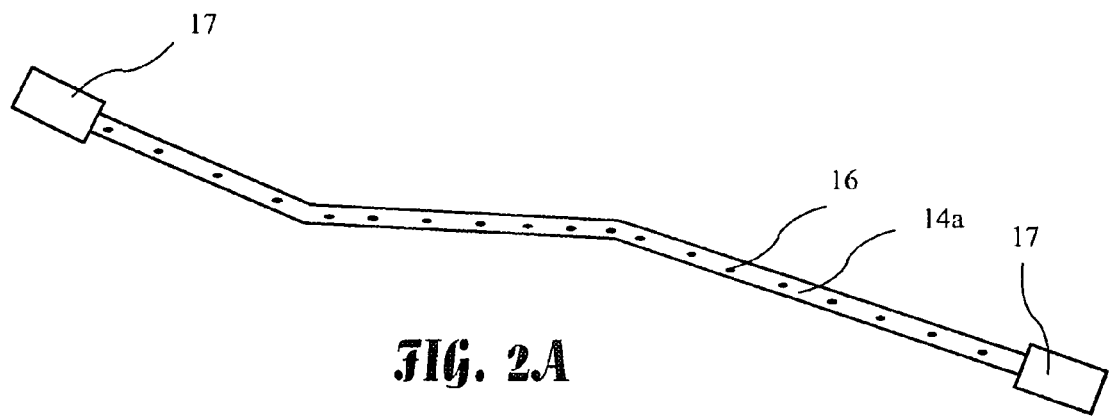
FIG. 2A depicts an extruded track according to the present invention.
Figure 2B:
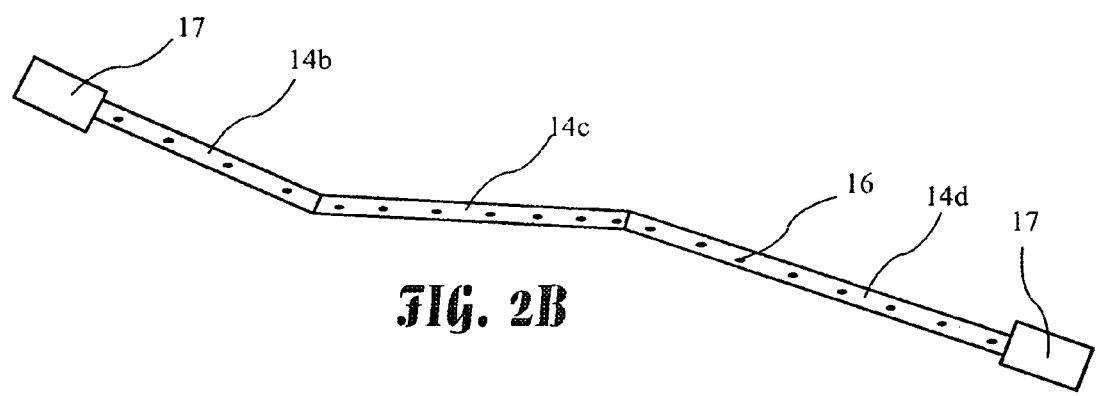
FIG. 2B depicts a sectioned track according to the present invention.

An extruded track 14a according to the present invention is shown in FIG. 2A, and a sectioned track having sections 14b, 14c, and 14d according to the present invention is shown in FIG. 2B. The track 14 thus extruded or constructed from sections may be conformed to the contours 12 (see FIG. 1) of the interior ceiling 11 and/or wall 10. The tracks 14 may also includes bumpers 17 on one or both ends. The bumpers 17 soften the deceleration of the trolley 18 when the trolley 18 reaches an end of the track 14.

Figure 3A:
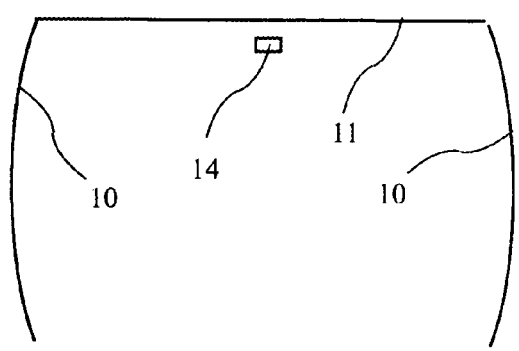
FIG. 3A shows the track in a normal working position spaced away from the interior ceiling and approximately centered between interior walls.
Figure 3B:
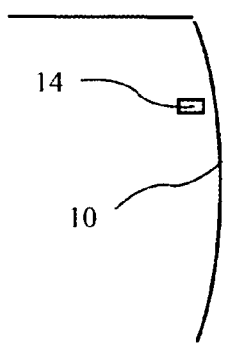
FIG. 3B shows the track in a retracted position against the interior wall.

The track 14 is shown in a normal working position approximately centered between the interior walls 10 in FIG. 3A, and the track 14 is shown in a retracted position against the interior wall 10 in FIG. 3B. Centering the track 14 between walls 10 often allows the best compromise between freedom of movement within the aircraft and protection from injury in the event of a unexpected aircraft motion. The track 14 may also be adapted for easy removal from the interior ceiling 11 or wall 10. Either retracting or removing the track 14 advantageously allows the aircraft to carry larger (or outsized) cargo.

A detailed perspective view of the trolley 18 and retractor 22 of the aircrew restraint system is shown in FIG. 4, and a perspective view of the trolley 18 without the retractor 22 is shown in FIG. 4A. The trolley 18 includes a receptacle 34 for attaching the retractor 22 to the trolley 18, which receptacle 34 is preferably a threaded female receptacle for accepting a threaded attachment 60 (se FIGS. 11 and 11A) protruding from the retractor 22. The retractor includes a retractor handle 72 for locking the retractor 22.

A front view of the trolley 18 with wheels 32 and a first track profile 15a arrangement is shown in FIG. 5A. The wheels 32 are spaced laterally apart and mounted on opposite sides of a wheel carrier 36. The track profile 15a reaches outside the wheels 32, down, and under the wheels 32. A side view of the trolley 18 is shown in FIG. 5B with wheels 32 spaced apart longitudinally. An interlock pin 38 is shown extended to cooperate with the interlock holes 16 to fix the position of the trolley 18 on the track 14.

A front view of the trolley 18 with the wheels 32 arranged with a second track profile 15b is shown in FIG. 6. In this embodiment, the track profile 15b resembles an inverted "T" with the wheels 32 on both sides of the T. The inverted "T" track profile may comprise a lightweight track 14a and a high strength interlocking pin support 39 for cooperation with a horizontal interlocking pin 38a as shown in FIG. 6A. The horizontal interlocking pin 38a passes through horizontal interlock holes in the track 14a and in the interlock pin support 39 to lock the trolley 18 in position on the track 14a. The horizontal interlocking pin 38a extends from a second wheel carrier 36a which supports both the wheel 32 and the horizontal interlocking pin 38a. The horizontal interlocking pin 38a may be directly mechanically attached to the trolley handle 20 or though linkage. A front view of the trolley 18 with the wheels 32 arranged for a third track profile 15c is shown in FIG. 7. In the third profile, the track profile 15c resembles a "J".

A cross-sectional view of the trolley 18 taken along line 8A-8A of FIG. 5B, with the interconnect pin 38 extended to lock (or fix) the trolley 18 to the track 14 is shown in FIG. 8A. A lever portion 20a of the trolley handle 20 is rotated in a counter clockwise direction along arc 21a. A pin spring 52 resides under the pin 38 thereby urging the pin 38 into the extended position.

Figure 9:
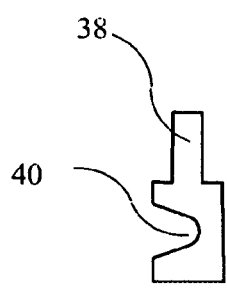
FIG. 9 is a detailed view of the interconnect pin.

A second cross-sectional view of the trolley 18 taken along line 8A-8A of FIG. 5B, with the interconnect pin 38 retracted is shown in FIG. 8B. The lever portion 20a of the trolley handle 20 cooperates with a handle notch 40 in the pin 38. The lever portion 20a is shown rotated clockwise along arc 21b, thereby pushing down on the pin 38 to unlock the trolley 18 from the track 14 (see FIG. 1). A detailed view of the interconnect pin 38 is shown in FIG. 9. The pin 38 includes the lever notch 40 for cooperation with the lever portion 20a of the lever 20.

Figure 10:
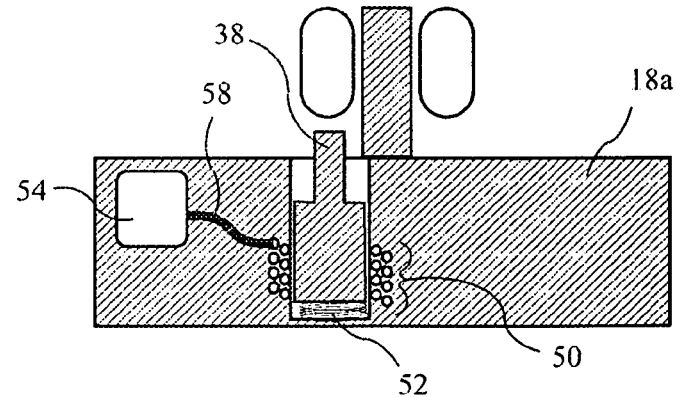
FIG. 10 shows a trolley with an accelerometer and a solenoid.

A second trolley 18a with a circuit 54 including an accelerometer and/or a remote control receive, and a solenoid 50 is shown in FIG. 10. The accelerometer senses high acceleration events of either the vehicle or the strap 24 (e.g., accelerations exceeding an acceleration threshold which may be directional) and causes the solenoid 50 to be de-energized and the trolley to be locked to prevent injury to the aircrew member 28. The trolley 18a will thus automatically lock itself to the track 14 in a crash event, using a manual lock (e.g., the trolley handle 20) only as a backup (in case of mechanical or battery failure). If the manual lock is used, the trolley 18 will remain locked to the track 14 until the manual lock is released. An example of an accelerometer suitable for use with the present invention is the MA-16-style vehicle acceleration sensor made by H. Koch and Sons in Anaheim, Calif., the assignee of the present invention. A crash sensor is described in U.S. Pat. No. 6,299,102 for "Aviation Crash Sensor," assigned to the assignee of the present invention. The '102 patent is herein incorporated by reference. The circuit 54 may further receive a signal from the remote control 30. Based on the signal received, the circuit 54 may energize or de-energize the solenoid 50 and pull the interconnect pin 38 into an unlocked position, or to release the interconnect pin 38 into a locked position.

A perspective view of the retractor 22 is shown in FIG. 11, and a side view is shown in FIG. 11A. The retractor 22 includes the threaded attachment 60 for attaching to the trolley 18, and a payout window 62 for paying out the strap 24.

A cross-sectional view of the retractor 22 taken along line 12-12 of FIG. 11A is shown in FIG. 12. A manual retractor lock 68 cooperates with a retractor shaft 64 to lock the retractor 22. The retractor lock 68 may be manually engaged by the pulling the retractor handle 72 when in a manual mode, or automatically engaged by the acceleration sensor, based on a selected maximum payout, or directly controlled by the remote transmitter 30 when in an auto-lock mode. A mechanical linkage 92 connects a locking module 80 to the retractor lock 68. The strap 24 is wound around the retractor shaft 64, and a rotary encoder 66 measures the rotation of the retractor shaft 64. The aircrew member 28 may set a maximum payout using the remote transmitter 30, and the rotary encoder 66 stores the position of the shaft 64 at the selected maximum payout. Later, if the rotary encoder 66 determines that the maximum payout has been reached, the rotary encoder 66 will cycle the retractor lock 68 to the lock (or ratchet) position, wherein the retractor ratchets the strap 24 in, but does not release any of the strap 24. The locking module 80 may further cycle the retractor 22 back to the auto-lock mode after the strap 24 has retracted a number of turns of the retractor shaft 64, preferably approximately two turns, unless the retractor acceleration sensor has locked the retractor 22. A locking mechanism suitable for locking the retractor 22 is described in U.S. Pat. No. 4,801,105 for "Shoulder Harness Reel Assembly with Automatic Reel Lock," and a vehicle acceleration sensing locking system is described in U.S. Pat. No. 5,636,807 for "Acceleration Sensor Having Inertia Weight Responsive to Accelerations in Every Direction." The '105 and the '807 patents are herein incorporated by reference.

The locking module 80, batteries 82, and remote receiver 83 are shown attached to the retractor 22, but may also be detached from the retractor 22, for example attached to the trolley 18. The locking module 80 may be directly connected to the retractor lock 68 by the mechanical linkage 92 to lock or unlock the retractor lock 68, or may cooperate with a second retractor lock independent of the manual retractor lock 68. The remote receiver 83 receives signals from the remote transmitter 30, and controls the locking module 80 based on the signals. The locking module 80 receives operating power from the batteries 82 and cycles a retractor handle 72 when prompted by the remote receiver 83. The locking module 80 preferably includes either a solenoid valve or a geared motor and will not interfere with manual operation of the retractor handle 72. The locking module 80 preferably operates on batteries or vehicle power, and more preferably operates on batteries, and most preferably on between two to four D-cell batteries, and may require a Built In Test (BIT) check to determine battery status.

The remote receiver 83 preferably is able to differentiate between the signal from a corresponding remote transmitter 30 and the signals of other remote transmitters. The remote receiver 83 may operate in a low power "sleep" mode until receiving a "wake-up" signal from the remote transmitter 30. When a state change request (i.e., to lock or unlock the retractor lock 68) is received, the remote receiver 83 sends a command to the locking module 80 to actuate the mechanical linkage 92. The remote receiver 83 operates on either battery 82 or a few (for example four) lithium coin cell batteries, and may require a Built In Test (BIT) check to determine battery status.

The locking module 80 may further receive a signal from an accelerometer residing in the trolley 18 as described above, or include a second accelerometer of the kind described above. The locking module 80 may thereby lock the retractor 22 in the presence of sensed accelerations to prevent or reduce injury to the aircrew member 28. A viscous damping system may be included in the retractor 22 to avoid injuries caused by releasing the harness buckle or quick-release buckle at significant amounts of strap 24 payout. An example of an appropriate viscous damping system is described in U.S. Pat. No. 5,794,878 for "Device for Prevention of Slap-Back Lock of Inertia Reel." The viscous damping system preferably slows the strap 24 retraction rate during the last approximately one to three feet of strap take-up, and more preferably slows the strap 24 retraction rate during the last approximately 1-1.5 feet of strap take-up. The viscous damping system may be integrated into the locking module 80. The '878 patent is incorporated herein by reference.

A first locking module 80a including a solenoid 84 for actuating the mechanical linkage 92 is shown in FIG. 13A, and a second locking module 80b including an electric motor 86, a gear 88, and a rack 90 connected to the mechanical linkage 92 is shown in FIG. 13B. The locking module 80 may further include any kind of linear actuator or rotary actuator, and preferably includes a linear actuator connect to the mechanical linkage 92.

A first harness interface comprising two webbing straps 24a, 24b attached between the strap 24 and shoulder straps 76 is shown in FIG. 14A. To avoid the snags and entanglement associated with a large open loop, the two webbing straps 24a, 24b are preferably contained within a triangular yoke 74a. The webbing straps 24a, 24b are attached to the shoulder straps 76 by buckles 78a (also called tang ports). A harness release handle 96 resides in or on the yoke 74a, and is attached to the buckles 78a. The harness release handle 96 is covered by a handle cover 96a. The webbing straps 24a, 24b include two buckles (similar to a ruggedized 5-point harness buckle without the lap strap ports) which accept the two shoulder straps 76. A dual-motion release may be incorporated into the buckles 78a could include a connector for a buckle release cable connected to the harness release handle 96. Additionally, a water activated release mechanism may be included to release a crew member should a buckle become immersed in water. Such release mechanism is described in U.S. patent application Ser. No. 10/665,922 for "Water Activated Release Triggering Mechanism," filed Sep. 19, 2003 and assigned to the assignee of the present application.

A second harness interface comprising the webbing straps 24a, 24b attached between the strap 24 and a buckle 78b, is shown in FIG. 14B. In this example, the webbing straps 24a, 24b are permanently connected to the shoulder straps 76 and the are preferably contained within a second triangular yoke 74b. The harness release handle 96 resides in or on the yoke 74b, and is attached to a buckle release cable 97 which connects to the buckle 78b for releasing the buckle 78b. The buckle 78b is attached to the yoke 74b and include a single tang port. The buckle 78b may include an integral dual-motion release device thereby requiring two motions to release the buckle (for example, lifting the handle cover 96a and then pulling the handle 96), or the buckle 78b may include an interface via the cable 97 to the quick-release handle 96. If the buckle 78b does not incorporate a dual-motion release device, it must be actuated by a dual-motion, quick-release handle sewn into the yoke 74b. The handle 96 may be enclosed beneath the handle cover 96a to avoid snags and inadvertent releases.

Figure 15:
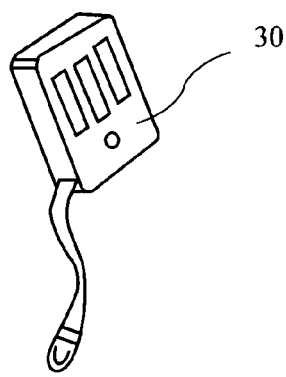
FIG. 15 is a perspective view of a remote control.
Figure 16:
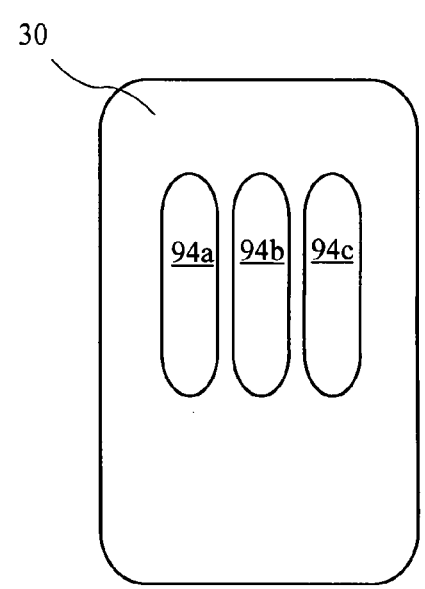
FIG. 16 is a front view of the remote control with three buttons.

A perspective view of the remote transmitter 30 is shown in FIG. 15, and a front view is shown in FIG. 16. The remote transmitter 30 includes at least a button 94a to change the state of the retractor lock 68 (see FIG. 12). The remote transmitter 30 should not interfere with navigation and communication equipment in the aircraft, and preferably does not continuously emit a signal which could be discovered by spectrum monitoring devices (radar, IR, etc.). Up to six retractors may be present in a single large aircraft, therefore, the remote transmitter 30 for each retractor must actuate only a corresponding retractor. Also, the signal must not be strong enough to acuate retractors installed in other aircraft flying in formation. Preferred frequency spectrums used by the remote transmitter 30 are 400 MHZ, 900 MHz, and 2.4 GHz, and/or may utilize Bluetooth® communications technology. The remote transmitter 30 preferably operates on one or more lithium coin cell batteries, and may include a BIT check to determine battery status.

A preferred remote transmitter 30 includes the button 94*a*, and two additional buttons 94*b*, and 94*c*. The button 94*b* is used to set maximum payout. The aircrew member 28 steps to a location (for example a door) of the aircraft and presses the button 94*b*. When the button 94*b* is pressed, the locking module 80 records the position of the rotary encoder 66. When the retractor 22 pays out a small pay-out amount of the strap 24 beyond the recorded encoder position, the locking module 80 cycles the retractor lock 68 (see FIG. 12) to the locked position, thereby preventing further payout of the strap 24 and thus reducing the likelihood that the aircrew member 28 will encounter injury (for example by falling out of the aircraft) while performing their duties. The pay-out amount is preferably between two and six inches, and more preferably approximately three inches. The third button 94*c* cancels the maximum payout setting. Alternatively, the remote control may include two buttons, and pressing both buttons concurrently one or more times may cancel the maximum payout setting.

While the invention herein disclosed has been described by means of specific embodiments and applications thereof, numerous modifications and variations could be made thereto by those skilled in the art without departing from the scope of the invention set forth in the claims.

We claim:

1. A mobile aircrew restraint system comprising:
   a track;
   a trolley running along the track and including a trolley lock to lock the trolley at spaced apart positions along the track;
   a retractor attached to the trolley;
   a strap, wherein the strap is retractable and extendable from the retractor; and
   a harness attached to the strap.

2. The mobile aircrew restraint system of claim 1, wherein the trolley includes an interlock pin and the track includes spaced apart interlock holes, wherein the trolley may be locked relative to the track by engaging the interlock pin into one of the interlock holes.

3. The mobile aircrew restraint system of claim 2, wherein interlock holes are spaced between one and two feet apart along the track.

4. The mobile aircrew restraint system of claim 1, wherein the trolley includes an acceleration sensor adapted to actuate the trolley lock to lock the trolley to a position on the track when a level of acceleration is sensed.

5. The mobile aircrew restraint system of claim 4, further including impact absorbers on ends of the track to prevent a false positive by the acceleration sensor.

6. The mobile aircrew restraint system of claim 1, wherein a maximum payout of the strap is setable by an aircrew member.

7. The mobile aircrew restraint system of claim 6, wherein:
   if the maximum payout has been set, the retractor monitors the payout of the strap; and
   if the maximum payout has been reached, the retractor switches to a ratchet position wherein the retractor ratchets the strap in, but does not release any of the strap.

8. The mobile aircrew restraint system of claim 6, wherein the maximum payout is setable by the aircrew member using a remote control.

9. The mobile aircrew restraint system of claim 6, wherein the retractor is manually lockable by the aircrew member using a retractor handle attached to the retractor.

10. The mobile aircrew restraint system of claim 6, wherein the maximum payout of the strap is setable by extending the strap to a desired maximum payout, and actuating a switch on a remote control.

11. The mobile aircrew restraint system of claim 1, further including a viscous damping system to slow the rate of strap retraction in the last between one and 1.5 feet of strap retraction.

12. A mobile aircrew restraint system comprising:
    a track having spaced apart interlock holes;
    a trolley running along the track and including an interlock pin to cooperate with the interlock holes to lock the trolley at positions along the track;
    a retractor attached to the trolley;
    a strap, wherein the strap is retractable and extendable from the retractor; and
    a harness attached to the strap,
    wherein the retractor is a lockable retractor whereby the strap is lockable against extension from the retractor.

13. The mobile aircrew restraint system of claim 12, further including a manual release handle attached to the trolley for locking and unlocking the interlock pin.

14. The mobile aircrew restraint system of claim 12, wherein the interlock pin is normally biased into a locked position.

15. The mobile aircrew restraint system of claim 12, further including a circuit for electronically locking and unlocking the interlock pin.

16. A mobile aircrew restraint system comprising:
    a track having a multiplicity of spaced apart interlock holes;
    a trolley running along the track and including an interlock pin to cooperate with the interlock holes to lock the trolley at the spaced apart interlock holes along the track;
    a retractor attached to the trolley;
    a strap, the strap extendable and retractable from the retractor, and the retractor is setable to set a maximum strap payout from the retractor; and
    a harness attached to the strap.

17. The mobile aircrew restraint system of claim 16, wherein:
    the retractor includes a rotary encoder for providing a measurement of the payout of the strap from the retractor;
    the maximum payout of the strap is setable by an aircrew member; and
    when the maximum payout is set, the payout of the strap is limited to not exceed the maximum payout.

18. The mobile aircrew restraint system of claim 17, wherein the maximum payout is setable using a remote transmitter.

19. The mobile aircrew restraint system of claim 18, further including a viscous damping system to slow the rate of strap retraction in the last between one and 1.5 feet of strap retraction.

* * * * *